United States Patent [19]

Morton et al.

[11] 3,753,085
[45] Aug. 14, 1973

[54] NON-DESTRUCTIVE TESTING APPARATUS FOR DETECTING BOTH TRANSVERSE AND LONGITUDINAL WELD DEFECTS WITH A SINGLE INSPECTION

[75] Inventors: Arthur W. Morton; Donald Lloyd, both of Houston, Tex.

[73] Assignee: Tex-Tube Division of Detroit Steel Corporation, Houston, Tex.

[22] Filed: Mar. 13, 1972

[21] Appl. No.: 234,295

[52] U.S. Cl. .................................................. 324/37
[51] Int. Cl. ............................................ G01r 33/12
[58] Field of Search ........................ 324/37, 34 R, 40

[56] References Cited
UNITED STATES PATENTS

| 2,881,387 | 4/1959 | Wood | 324/37 |
| 3,579,099 | 5/1971 | Kanbayashi | 324/37 |
| 3,619,769 | 11/1971 | Kusenberger | 324/37 |

FOREIGN PATENTS OR APPLICATIONS

| 1,116,919 | 11/1961 | Germany | 324/37 |

Primary Examiner—Robert J. Corcoran
Attorney—Pravel, Wilson & Matthews

[57] ABSTRACT

Non-destructive testing apparatus for locating anomalies or defects in either a longitudinal or circle weld in a pipe, wherein the signal-to-noise ratio is increased by the use of bidirectional magnetization at the area of inspection and by the spacing of the anomaly detector probe off the pipe a predetermined distance, whereby discontinuities or weld anomalies at any point through the weld from the outside diameter to the inside diameter can be detected, and by a predetermined positioning of the coils of the probe, the weld anomalies may be detected whether extending predominantly longitudinally or laterally. The pipe may be inspected as it is run through the pipe mill during its manufacture, without utilizing a separate run of the pipe for the inspection.

8 Claims, 9 Drawing Figures

PATENTED AUG 14 1973

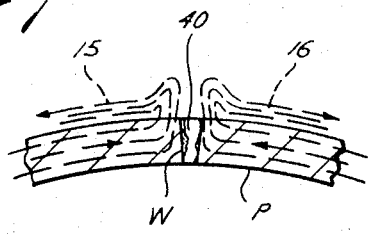
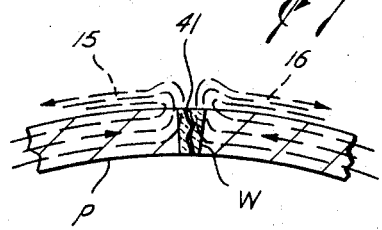
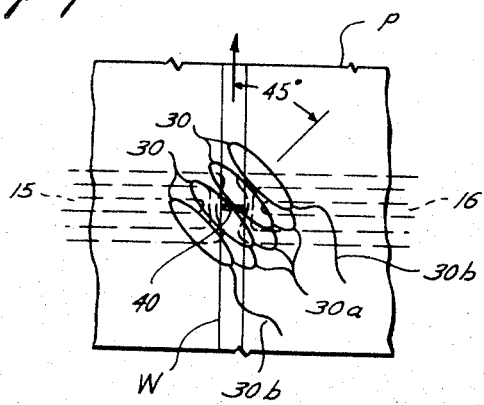
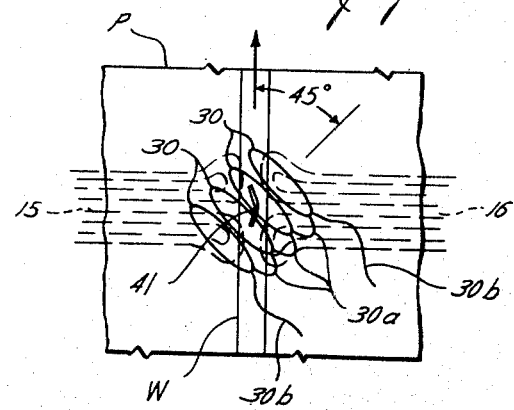
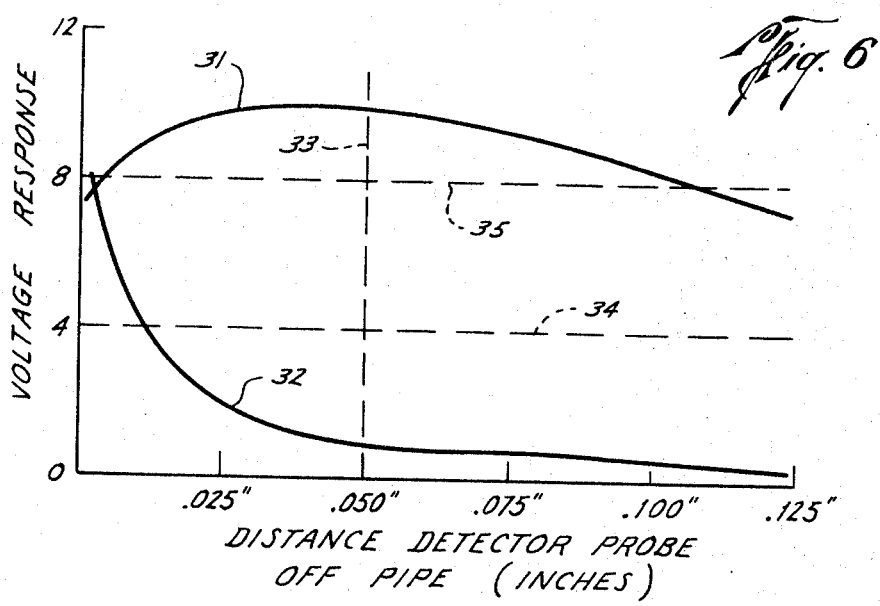

NON-DESTRUCTIVE TESTING APPARATUS FOR DETECTING BOTH TRANSVERSE AND LONGITUDINAL WELD DEFECTS WITH A SINGLE INSPECTION

BACKGROUND OF THE INVENTION

The field of this invention is non-destructive testing apparatus.

Various efforts to obtain indications of defects or anomalies in pipe or welds have been made in the past, examples of which are shown in U. S. Pat. Nos. 2,098,064; 2,353,211; 2,650,344; 2,685,672; 3,271,664; 3,411,344; 3,579,099; and 3,612,987. As can be seen from such patents, those such as U. S. Pat. No. 3,271,664 which use a yoke employ a single coil with a unidirectional field through the pipe or weld. It can also be seen that the more recent patents such as U. S. Pat. Nos. 2,685,672 and 3,612,987 emphasize the shoe contact of the detector with the pipe for detecting the anomalies. It has been found that both of such prior concepts are highly detrimental to magnetic non-destructive detection of defects because of the high noise-to-signal ratio developed. Furthermore, as noted in U.S. Pat. No. 3,579,099, flaws have generally been detectable only near the external pipe surface rather than throughout the full weld depth. Another approach of the prior art, which is exemplified by U. S. Pat. Nos. 2,650,344 and 3,411,344, has been to vibrate either the pipe being inspected or the detector apparatus; such approach was an unsatisfactory attempt to overcome the problems of varying speeds of pipe travel in a pipe mill.

SUMMARY OF THE INVENTION

The present invention relates to new and useful improvements in non-destructive testing apparatus wherein the signal-to-noise ratio is substantially increased so that discontinuities or anomalies in both longitudinal and circular welds may be more positively located and indicated, throughout the full depth of the weld. In the preferred embodiment, the magnetizing of the weld area is effected by a yoke type magnet having a pair of coils, one on each side of the detector coil or probe, so as to create a bidirectional magnetization at the point of inspection which tends to neutralize electrical noise in the defect detector. Additionally, the detector probe or coil is deliberately disposed a predetermined distance off the pipe to minimize noise created as a result of the relative movement of the detector probe and the weld being inspected. Longitudinal welds in pipe may be detected as it is being manufactured in the pipe mill without utilizing a separate run for such inspection and without vibration or other movement of the pipe or detection unit. Defects or anomalies in either the longitudinal or transverse direction may be detected with the apparatus of this invention by a single transducer coil or set of coils disposed at approximately 45° to the axis of the pipe, whereby all defects may be detected with a single inspection and a single detection apparatus.

BRIEF DESCRIPTION OF THE DRAWINGS

FIG. 4 is a schematic vertical sectional view illustrating the change in the normal lines of magnetic flux when a transverse defect is encountered in the weld being inspected;

FIG. 4A is a plan view corresponding to FIG. 4, and illustrating the lines of flux as they appear looking down upon them, with the detector coils superimposed thereon in their normal position with respect to the weld;

FIG. 5 is a view similar to FIG. 4, but illustrating the lines of flux as changed by a substantially longitudinally extending crack or defect in the weld;

FIG. 5A is a plan view corresponding to FIG. 5 and illustrating the pattern of the lines of flux when they encounter the substantially longitudinally extending crack or defect, and with the detector coils superimposed thereon;

FIG. 6 is a graph illustrating the relationship between the signal and noise in the detector means of this invention, at various locations of the detector means off of the pipe being inspected.

DESCRIPTION OF THE PREFERRED EMBODIMENTS

Figure 1:
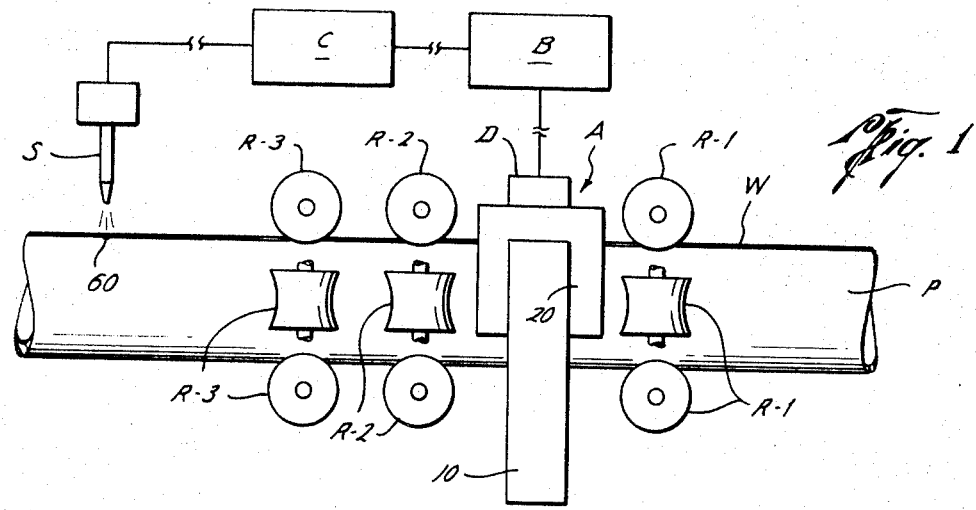
FIG. 1 is a generally schematic view illustrating the apparatus of this invention installed in a conventional pipe mill for the inspection of longitudinal welds in the pipe as it is being manufactured.

In the drawings, the letter A designates generally the apparatus of this invention which is adapted to be used for inspecting a weld W in a pipe P as the pipe P is formed in a pipe mill, and without requiring a special run of the pipe for inspection. With the apparatus of this invention, the weld W may be inspected with the apparatus A even though there are substantial variations in the speed of travel of the pipe P relative to the apparatus A. Also, the signal-to-noise ratio is considerably increased as compared to the prior art apparatus so that all defects in the weld W are of a size which might result in rupture or failure of the pipe P at the weld W are located positively and accurately. Also, the apparatus A may be utilized for inspecting circle or circular welds in a pipe by rotating the pipe relative to the apparatus A, or vice versa. Thus, although the invention is described hereinafter specifically with respect to the inspection of a longitudinal weld W in a pipe P which is inspected as it is run in its normal mill travel during manufacture, it will be understood that the invention is also applicable to the inspection of circular or circle welds in a mill, the field, or elsewhere.

Considering the invention more in detail, and particularly the schematic illustration of FIG. 1, the apparatus A is shown therein positioned between a first set of conventional pipe mill feeding rollers R-1 disposed upstream of the apparatus A and one or more sets of rollers R-2 and R-3 disposed downstream of such apparatus A. By disposing the apparatus A between the sets of rollers, which may be feeding rollers or a combination of feeding and guiding rollers R-1 through R-3, the apparatus A inspects the pipe P at a point wherein the pipe P is virtually free of vibration. It will be understood that although only three rollers R–1 are illustrated, there normally are four of such rollers, with an upper and a lower roller R–1 and two side rollers R–1, one of which is hidden in FIG. 1. The same arrangement is provided normally for the rollers R–2 and R–3 so that there is full support and confinement of the pipe P against vibration between the sets of rollers R–1 and R–2, which is the point of location of the apparatus A.

In the preferred embodiment, the apparatus A has a signal panel which is represented at B in FIG. 1 and which may have lights, an oscilloscope, a strip chart and other indicator means for indicating the defects which are detected by the apparatus A. Also, preferably the apparatus includes a spray device S which is adapted to spray paint or other marking material on the pipe at the point of a defect downstream from the apparatus A so as to avoid spraying paint on the apparatus A itself. The paint sprayer S is controlled through any suitable equipment such as a spray control unit C which is electrically connected back to the apparatus A as is more fully illustrated by the schematic electrical diagram of FIG. 7.

Figure 2:
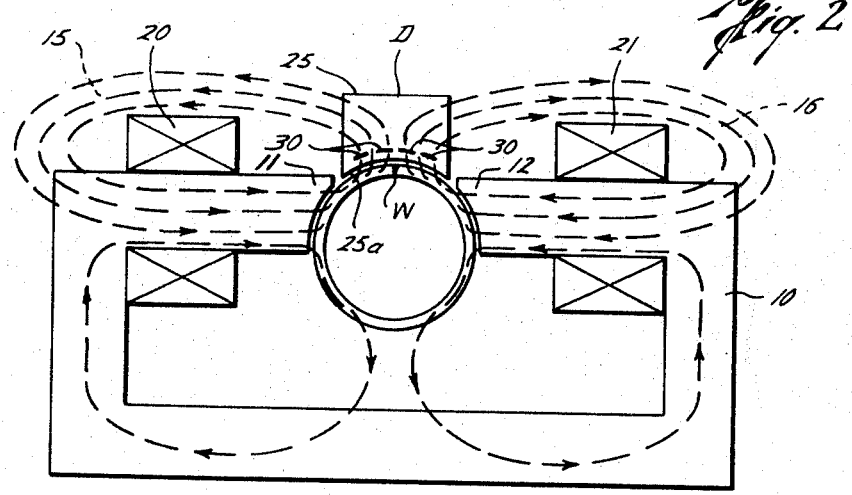
FIG. 2 is a diagrammatic vertical sectional view illustrating the magnetizing portion of the apparatus of this invention together with a portion of the detector means, illustrating in particular the lines of magnetic flux.
Figure 3:
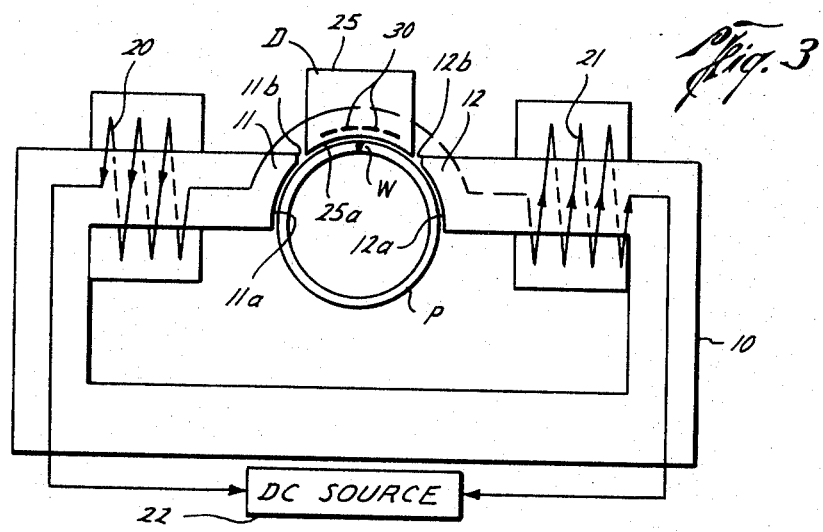
FIG. 3 is a view similar to FIG. 2, but illustrating the electrical circuit for the magnetizing of the two electromagnetic coils disposed, one on each side of the pipe weld being inspected.

As illustrated in FIGS. 2 and 3, the apparatus A has a magnetizing means which includes a yoke 10 made of high permeability steel or other metal and which has pole pieces 11 and 12 with a gap therebetween into which the pipe P is disposed. The pole pieces 11 and 12 have inner curved surfaces 11a and 12a, respectively, which have a curvature generally conforming with and spaced from the curvature of the external surface of the pipe P which is being inspected. Preferably, the pole pieces 11 and 12 are disposed at the upper portion of the pipe P and the upper ends 11b and 12b, respectively, terminate in cut-off points which are substantially in alignment with the weld W which is being inspected. Generally, the lower portion of the pole pieces 11 and 12 do not extend below the center line of the pipe P which is being inspected for concentrating the lines of flux in the upper portion of the pipe P in the vicinity of the weld W, as illustrated in FIG. 2 by the lines of magnetic flux 15 and 16 from the pole pieces 11 and 12, respectively. For creating the bidirectional magnetic lines of flux 15 and 16 in the pattern illustrated in FIG. 2, a pair of magnetizing coils 20 and 21 are disposed on opposite sides of the pipe P, with the coil 20 providing the lines of flux for the pole piece 11 and with the coil 21 providing the lines of flux for the pole piece 12. The electrical connection which is preferred for such coils 20 and 21 is illustrated in FIG. 3, which illustrates that the coils 20 and 21 are wound in opposite directions from each other so as to neutralize electrical noise from the coils themselves which might be picked up by the detector apparatus, as will be more evident hereinafter. Such disposition of the coils 20 and 21 and the bidirectional lines of flux 15 and 16 are an important factor in creating the high signal-to-noise ratio obtainable with the present invention. Any suitable source of electrical power such as indicated by the DC source is FIG. 3 is supplied to the windings of the coils 20 and 21, and it will be understood that such source of electrical power may be located remotely from the apparatus A and the pipe P.

Figure 7:
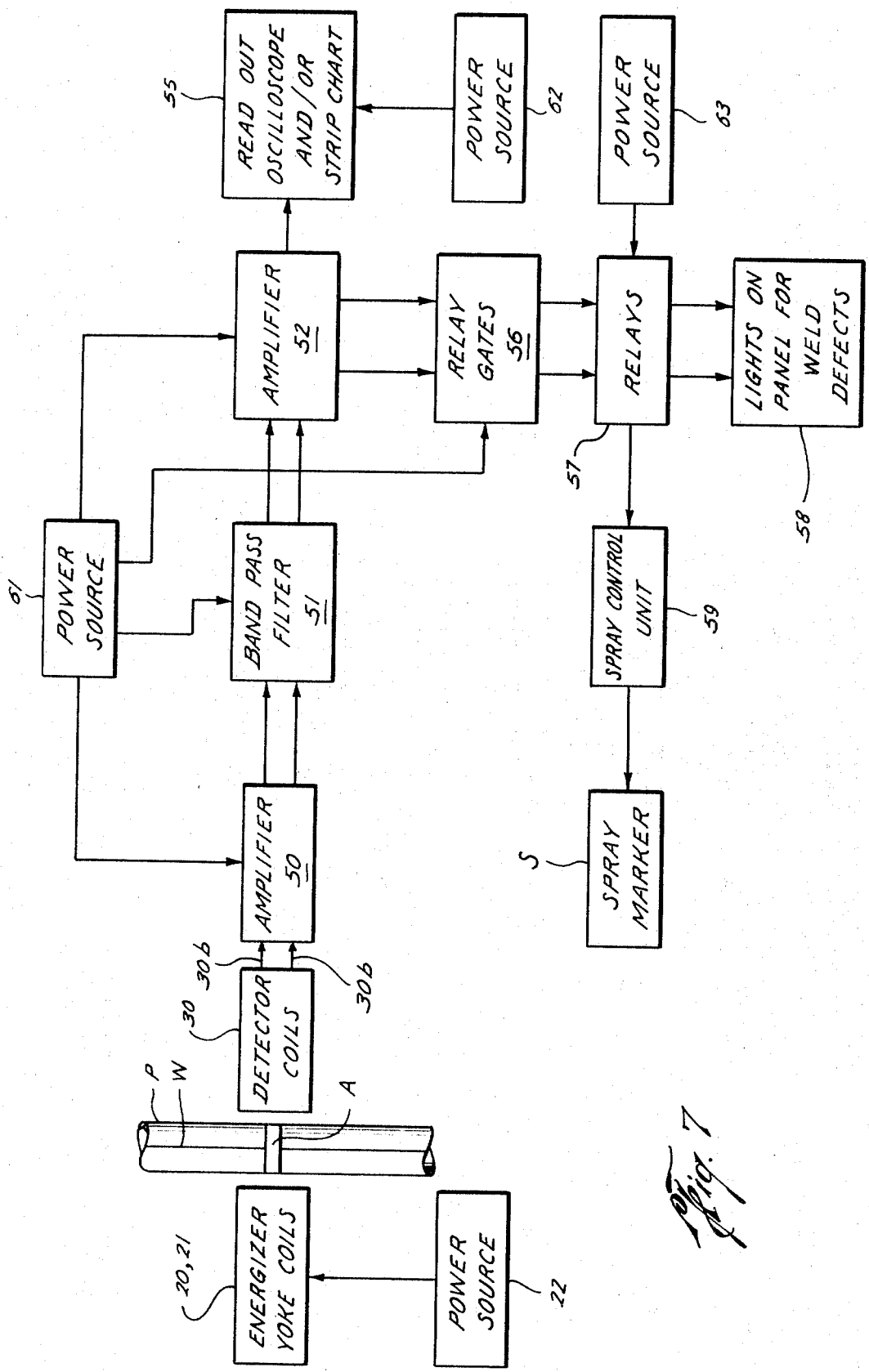
FIG. 7 is a schematic view of the electrical circuit of the apparatus of this invention in its preferred embodiment.

A detector means D which includes a probe or support 25 of conventional construction is mounted with one or more detector coils 30 (FIGS. 2, 3, 4A and 5A) mounted therewith. The coils 30 are disposed, in the preferred embodiment, at an angle of about 45° with respect to the longitudinal axis of the pipe P, as indicated in FIGS. 4A and 5A. Preferably, there are four of such coils 30, which are disposed so as to extend across the lines of flux 15 and 16, with the adjacent coils being wound in opposite directions and interconnected by connector wires 30a. The terminal leads or wires 30b extend to and are connected in the detector circuit, as schematically illustrated in FIG. 7, and as will be more evident hereinafter.

The bottom or lower surface 25a of the detector coil support or probe 25 is preferably curved to conform generally with the external curvature of the pipe P and it is disposed off of the surface of such pipe P a predetermined distance, as will be more fully explained hereinafter. The coil or coils 30 with the probe or support 25 are located between the magnetizing coils 20 and 21 and in proximity to the pole pieces 11 and 12 as best seen in FIGS. 2 and 3. It has been found that it is important to have the lower or bottom surface 25a off of the pipe 25 so that there is no contact with the weld W or any part of the pipe P to avoid the noise generated in the prior art devices wherein contact was made between the detector shoe and the external surface of the pipe P. It has been found empirically and surprisingly that there is an optimum distance for the location of the coils 30 off of the pipe P to obtain the maximum signal-to-noise ratio. The empirical results are demonstrated by the graph shown in FIG. 6, wherein the signal voltage is indicated by the upper curve 31 and the noise voltage is indicated by the lower curve 32. The abscissa axis is marked to show the distance that the detector probe surface 25a is disposed off of the surface of the pipe P, measured in inches, while the ordinate axis indicates the voltage readings using the apparatus A of this invention. The coil or coils 30 are normally positioned at or within 0.025 inches of the bottom surface 25a of the support or probe 25, and therefore the total distance of the coil or coils 30 off the pipe P is the sum of the distances shown on the chart of FIG. 6 plus the distance that the coil or coils 30 are located above the surface 25a.

A dotted line 33 is shown in FIG. 6 to indicate the optimum distance for the lower surface 25a to be located off of the pipe P, assuming that the transducer coil or coils 30 are disposed at or within about 0.025 inches above such surface 25a. As can be seen, the signal voltage at line 33 is in the neighborhood of about 10 volts, whereas the noise voltage is approximately one volt so that the signal-to-noise ratio is extremely high. Although the optimum distance for the surface 25a to be off of the pipe P is at 0.050 inches, it can be seen from the graph in FIG. 6, that it would be acceptable to have the distance fall within the range of about 0.025 inches to about 0.20 inches, because the noise signal 32 is gradually diminishing, even though the signal voltage is also diminishing after the optimum point indicated by the line 33.

In practice, any anomaly which gives a signal voltage of 4 volts or higher would be severe enough to require rejection of the section of the pipe P having such defect therein. In some instances, in practice, it is desirable to set the rejection voltage at less than 4 volts, depending on the application of the product as will be well understood by those skilled in the art. Thus, as seen in FIG. 6, there is a substantial variable range of voltage about 4 volts which would normally indicate defects, and the severity of the defect will produce different voltages. Thus, the present invention provides for a determination as to the quantity or size of the defect so that the section of the pipe having such defect can be rejected.

Thus, the high signal-to-noise ratio of the present invention is accomplished by a combination of features, which includes the disposition of the two coils 20 and 21 on opposite sides of the weld being inspected, with the detector means D therebetween. Also, as explained, the location of the lower surface 25a and the transducer coils 30 of the detector probe or support 25 off of the pipe P is a factor. The noise level is also reduced through the tuning circuit illustrated in FIG. 7, as will be discussed hereinafter. In any event, because of the high signal-to-noise ratio which is indicated such as at the point 33 in the chart of FIG. 6, it has been found that the apparatus A of the present invention may be used to examine welds W extending longitudinally of the pipe P, while the pipe P is still being run in the mill in the same line where it is manufactured. Heretofore, it was generally accepted practice to run any testing operations on pipe after it was removed from the manufacturing line or mill run of the pipe P because of the requirement in the prior art that the speed of travel of the pipe P be constant while making the inspection of the weld W. Such prior art procedure thus required a separate line for running the pipe P during its inspection to locate the cracks or other defects in the welds, although there have been efforts to avoid this as explained.

By way of specific example, pipe which is manufactured by forming it from a strip into a tubular shape and welding the longitudinal seam at the weld W is made in different wall thicknesses and different diameters and it is customarily run in pipe mills at speeds upwardly from about 25 feet per minute to about 150 feet per minute and higher, depending on the size of pipe and the equipment. However, because of the equipment feeding mechanism, the speed of movement of the pipe P in the mill varies as much as 10 to 15 percent or even more at various times. Such variation in the speed of travel of the pipe P in the mill has been a serious problem in the prior art insofar as the detection of anomalies or defects in the weld W were concerned. The present invention, on the other hand may be used for inspecting the pipe P directly on the mill run of the pipe P where it is being manufactured, without requiring a separate line for such inspection. This is made possible because of the high signal-to-noise ratio which is obtained with the apparatus of this invention, as indicated in particular in FIG. 6. Thus, even though the speed variations of the pipe P which is traveling in the mill may cause a variation in the signal voltage of plus or minus 1 to 2 volts, this still leaves the voltage indication high enough at all times so that the voltage falls above the rejection voltage of 4 volts when there is a serious defect in the weld W. The rejection voltage at 4 volts is indicated by the line 34 in FIG. 6. The signal voltage of 8 volts is indicated at line 35, to show that the range of variation of the voltage between lines 34 and 35 is as much 4 volts over the range of distances shown for the probe location off the pipe P. Thus, even if there is a drop in voltage of 1 or 2 volts which might occur with a reduced speed or variation in speed, the variable speed still does not prevent obtaining a usable indication of a serious defect in the weld W. At the same time, the noise voltage is so low that at no time is confused with the signal voltage rejection level of 4 volts.

It has further been found that with the apparatus A of this invention, the defects may be located even though they are not at the external surface of the weld W since substantially the same voltage is generated by defects which occur throughout the full depth of the weld from the outside diameter of the pipe P to the inside diameter thereof. This is made possible because of the bidirectional magnetic flux pattern illustrated in FIG. 2, using the two coils 20 and 21, and also because of the concentration of the magnetic lines of flux in the upper portion of the pipe P so as to penetrate the full depth of the weld W.

As discussed in U. S. Pat. No. 2,353,211, it was generally considered that the axis of the detector coil or coils should be disposed in the same general direction as the major axis of the particular defect sought. Contrary to such teaching, the applicants have found that when the coils 30 are disposed in substantially the same plane essentially parallel to the surface of the pipe P being inspected and at the angle of about 45° with respect to the axis of the pipe P, as illustrated in FIGS. 4A and 5A, both transverse and longitudinal discontinuities, anomalies or other defects may be readily located. Thus, with a generally transverse defect 40 as shown in FIGS. 4 and 4A, the lines of flux 15 and 16 are altered from their normal pattern so as to generate a signal voltage in the coils 30. Similarly, a generally longitudinal crack or defect 41 as shown in FIGS. 5 and 5A changes the magnetic lines of flux 15 and 16 as shown therein so as to also generate a signal voltage in the coils 30. Therefore, it can be seen that a single coil 30, or a set of coils 30 in substantially the same plane, when disposed at an angle of about 45° with respect to the longitudinal axis of the pipe P serves to detect both transverse and longitudinal cracks or defects in the weld W with a single inspection, thereby eliminating the need for a second set of coils and duplicate magnetizing and detecting apparatus.

In FIG. 7, the electrical circuit is schematically illustrated, wherein the energizer yoke coils 20,21 are shown connected to a suitable power source 22 which is likewise indicated in FIG. 3. The pipe P which is being inspected as shown in FIG. 7 in a schematic relationship to the detector coils 30 which are connected through their terminals 30b to a conventional amplifier 50, a band pass filter 51 and another amplifier 52, which in turn is connected to a read-out oscilloscope and/or a strip chart indicated at 55. The signal from the amplifier 52 is also transmitted through relay gates 56 to relays 57 which operate lights on a panel 58 for illustrating the weld defects, and which also operate a spray control unit 59 of any suitable construction for controlling the sprayer or spray marker S (see also FIG. 1). The spray control unit 59 is operated by a timer or other suitable means for causing the spray marker S to spray paint on a defect such as indicated at 60 in FIG. 1 after the pipe P has moved from the point of detection of such defect under the detector means D to the point of the sprayer S. Such lag in the operation of the sprayer S thus enables the sprayer S to be located downstream from the detector means D so that the paint or other marking medium sprayed by the sprayer S does not contact or interfere with the operation of the detector means D or the rest of the apparatus A.

Suitable power is available in the well known manner as indicated by the power sources 61, 62 and 63 in FIG. 7, and as will be well understood by those skilled in the art. The band pass filter 51 is of conventional design and is tuned in accordance with the skill of the art to pass only a range of voltage frequencies to minimize electrical noise which is amplified at the amplifier 52 and is transmitted electrically therefrom as previously explained to the readout equipment 55 and the lights 58. The amount of signal voltage for each defect is preferably indicated by different colored lights on the panel 58 for different voltages within the rejection range so that the operator can actually tell the extent of the defect by the color of the light on the panel.

In the use or operation of the apparatus A of this invention, it is preferably located between rollers R–1 and rollers R–2 which are the feeding and/or guiding rollers for the pipe P as it is moving in the mill run where the pipe is manufactured. The rollers R–1 and R–2, or any other suitable means serve to stabilize the pipe P on each side of the detector means D so that noise is not introduced into the detector means by reason of vibration of the pipe P or contact between the detector probe 25 or any other part of the apparatus A and the external surface of the pipe P or the weld W.

When a defect which exceeds the predetermined rejection voltage, e.g., 4 volts, is detected by the coils 30, the signal voltage is indicated on the light panel 58, and when the defect reaches the point of the sprayer S, the spray control unit 59 actuates the spray marker S to spray paint on the defect as indicated at 60 in FIG. 1. Thus, the operator has a signal that a defect is present in the pipe P, and the location of the signal is specifically marked by the sprayer S. Also, an oscilloscope reading and a strip chart may be provided as indicated at 55 in FIG. 7 so that the defects and their magnitude are recorded for future reference.

As previously noted, the present invention may also be used for detecting defects in circle welds. In such case, it will be understood that the pipe P is rotated relative to the apparatus A, or vice versa, and therefore the rollers R–1, R–2 and R–3 are replaced by rollers whose axes are parallel to the axis of the pipe to permit such relative rotation, as will be understood. Normally, the rotation and testing of the circle welds occurs in a separate line from the mill run of the pipe P.

The foregoing disclosure and description of the invention are illustrative and explanatory thereof, and various changes in the size, shape, and materials as well as in the details of the illustrated construction may be made without departing from the spirit of the invention.

I claim:

1. Non-destructive testing apparatus for locating discontinuities, anomalies or other defects in a weld area of a pipe, comprising:

a magnetizing yoke having spaced laterally extending pole pieces having a gap therebetween for positioning on opposite sides of a pipe in proximity to a weld area thereof to be inspected;

a pair of magnetizing coils mounted on said yoke, with one coil being mounted with each laterally extending pole piece and with the axis of each coil extending laterally;

a d.c. power means connected to said coils for energizing same and for creating a separate magnetic field in the vicinity of the weld area being inspected with the lines of flux in each magnetic field flowing towards each other and the weld area of the pipe but returning thereafter in opposite directions to form a closed loop of magnetic flux lines for each coil; and detector means including a detector coil disposed in the vicinity of the weld area being inspected in a plane substantially parallel to the surface of the pipe being inspected and between said pair of magnetizing coils for detecting defects in the weld.

2. The structure set forth in claim 1, wherein:

said detector coil has its lower surface spaced off of the weld area to be inspected so as to be out of contact therewith at all times.

3. The structure set forth in claim 2, wherein:

said detector coil has its lower surface spaced off of the weld area to be inspected at or within 0.025 inches of said lower surface.

4. The structure set forth in claim 1, wherein:

the longitudinal axis of said detector coil is disposed therewith at an angle of about 45° relative to the longitudinal axis of the pipe.

5. The structure set forth in claim 4, wherein:

said detector coil is one of four detector coils disposed in lateral alignment with each other and in substantially the same plane will all of said coils substantially parallel to the surface of the pipe being inspected and each having its longitudinal axis at an angle of about 45° relative to the longitudinal axis of the pipe, with adjacent coils being wound in the opposite directions and connected together to neutralize electrical noise from the detector coils.

6. The structure set forth in claim 1, including:

means for moving said pipe longitudinally relative to said magnetizing coils, yoke and detector means for detecting defects in a longitudinal weld.

7. The structure set forth in claim 1, including:

means for creating relative rotation between said pipe and said magnetizing coils, yoke and detector means for detecting defects in a circular weld.

8. The structure set forth in claim 2, including:

means for moving said pipe longitudinally relative to said magnetizing coils, yoke and detector means for detecting defects in a longitudinal weld; and means engaging said pipe on at least two sides both upstream and downstream of said magnetizing yoke, coils and detector means to substantially eliminate vibration of the pipe, whereby the distance of the detector off the weld is maintained during the relative longitudinal movement between the pipe and the detector means.

* * * * *